United States Patent
Broselow

(10) Patent No.: US 11,983,756 B2
(45) Date of Patent: May 14, 2024

(54) QUICK INFORMATION PORTAL

(71) Applicant: QI Technologies, LLC, Hickory, NC (US)

(72) Inventor: James Broselow, Hickory, NC (US)

(73) Assignee: QI TECHNOLOGIES, LLC, Hickory, NC (US)

( * ) Notice: Subject to any disclaimer, the term of this patent is extended or adjusted under 35 U.S.C. 154(b) by 0 days.

(21) Appl. No.: 17/729,783

(22) Filed: Apr. 26, 2022

(65) Prior Publication Data

US 2023/0132078 A1    Apr. 27, 2023

Related U.S. Application Data

(60) Provisional application No. 63/272,602, filed on Oct. 27, 2021.

(51) Int. Cl.
*G06Q 30/00* (2023.01)
*G06Q 30/0601* (2023.01)

(52) U.S. Cl.
CPC ................ *G06Q 30/0625* (2013.01)

(58) Field of Classification Search
CPC .................................. G06Q 30/0625
See application file for complete search history.

(56) References Cited

U.S. PATENT DOCUMENTS

| | | | |
|---|---|---|---|
| 7,520,419 | B2 | 4/2009 | Libin et al. |
| 7,827,043 | B2 | 11/2010 | Tahan |
| 7,849,620 | B2 | 12/2010 | Hussey et al. |
| 8,819,837 | B2 | 8/2014 | Lacey |
| 8,881,990 | B2 | 11/2014 | Hunt et al. |

(Continued)

FOREIGN PATENT DOCUMENTS

| | | |
|---|---|---|
| CN | 113425048 A | 9/2021 |
| EP | 3479334 A1 | 3/2020 |

(Continued)

OTHER PUBLICATIONS

Why the QR code become ubiquitous in India, by Shailesh Menon, The Economic Times [New Delhi], Oct. 25, 2021, (Year: 2021).*

(Continued)

*Primary Examiner* — Anne M Georgalas
(74) *Attorney, Agent, or Firm* — Seth L. Hudson; Maynard Nexsen PC

(57) ABSTRACT

In one aspect, a computer implemented method for providing rapid access to product information on a mobile computing device is disclosed. The method includes provisioning an online platform and associating a database repository. Next, the method generates a visual code and identifies the visual code to a domain name. Then the visual code is populated with information, such as product information, wherein the product information is associated to the visual code that is further linked to the data repository and online platform. The association allows for multiple file types and acquisition from web scraping. Further, the online platform allows for editing content behind the domains and generating further subdomains that further link to the original visual code. Thereby providing, in one aspect, a quick information portal through the use of visual codes and data structuring.

8 Claims, 14 Drawing Sheets

(56) References Cited

U.S. PATENT DOCUMENTS

| | | |
|---|---|---|
| 8,960,555 B1 | 2/2015 | Walton, III |
| 9,348,970 B2 | 5/2016 | Walton, III |
| 9,361,657 B2 | 6/2016 | Hunt et al. |
| 9,424,504 B2* | 8/2016 | Annamalai ............. G06T 11/60 |
| 10,375,060 B1* | 8/2019 | Graves .................. H04W 12/77 |
| 10,515,428 B2 | 12/2019 | Nolte et al. |
| 11,056,245 B2 | 7/2021 | Constantino et al. |
| 11,275,407 B2 | 3/2022 | Edwards |
| 2002/0038255 A1* | 3/2002 | Tarvydas ........... G06Q 30/0635 |
| | | 705/26.43 |
| 2008/0300921 A1 | 12/2008 | Carlton |
| 2013/0073687 A1* | 3/2013 | Cok .................... G06F 16/9554 |
| | | 709/219 |
| 2013/0126601 A1 | 5/2013 | Lee |
| 2013/0219479 A1* | 8/2013 | DeSoto .................. H04L 63/08 |
| | | 726/6 |
| 2014/0142979 A1 | 5/2014 | Mitsunaga |
| 2014/0316991 A1* | 10/2014 | Moshal .................. G06Q 20/40 |
| | | 705/64 |
| 2014/0325328 A1* | 10/2014 | Beadles ................ G06F 40/134 |
| | | 715/208 |
| 2015/0039338 A1 | 2/2015 | Tregnaghi |
| 2015/0090784 A1 | 4/2015 | Petaia |
| 2016/0323107 A1* | 11/2016 | Bhogal ................. H04W 12/10 |
| 2016/0323108 A1* | 11/2016 | Bhogal ................. H04W 12/08 |
| 2018/0039737 A1 | 2/2018 | Dempers et al. |
| 2019/0251623 A1* | 8/2019 | Tong .................. G06Q 30/0623 |
| 2020/0294634 A1 | 9/2020 | Katz |
| 2021/0192003 A1* | 6/2021 | Kargaran ............ G06F 16/9554 |
| 2021/0258165 A1* | 8/2021 | Woo ........................ G06F 21/45 |
| 2021/0312576 A1* | 10/2021 | Clarke ................ G06Q 20/202 |
| 2021/0326474 A1* | 10/2021 | Sparks .................. G06Q 10/10 |
| 2022/0156790 A1 | 5/2022 | Bigley |
| 2022/0414251 A1 | 12/2022 | Wechsler |

FOREIGN PATENT DOCUMENTS

| | | |
|---|---|---|
| JP | 2003036313 A | 2/2003 |
| JP | 6142954 B1 | 6/2017 |
| JP | 6713323 B2 | 6/2020 |
| JP | 2002083062 A | 3/2022 |
| KR | 200459026 Y1 | 3/2012 |
| WO | 2012094329 A1 | 7/2012 |
| WO | 2016038248 A1 | 3/2016 |

OTHER PUBLICATIONS

"Online Invoicing System Based on QR Code Recognition and Cloud Storage," by Wei Zhang, 2018 2nd IEEE Advanced Information, Management, Communicates, Electronic and Automation Control Conference (Year: 2018).*

* cited by examiner

300

| EXAMPLE MYQUIP FOR A VACATION RENTAL | CONTENT EXAMPLES |
|---|---|
| WELCOME MESSAGE | VIDEO WELCOME MESSAGE |
| HOUSE RULES | DOCUMENT |
| WIFI AND APPLIANCE DETAILS | DOCUMENT |
| THINGS TO SEE AND DO | TEXT INCLUDING HYPERLINK TO TOWN INFORMATION WEBSITE |
| EMERGENCY INFO | DOCUMENT |

FIG.3

```
600
┌─────────────────────────────────────────────┐
│            CODE GENERATOR FORM              │
│  TYPE OF DURATION:                          │
│  ┌─────────────────────────┐                │
│  │       PROQUIP         ▽ │                │
│  └─────────────────────────┘                │
│  NUMBER OF CODE:                            │
│  ┌───────────────────────────────────┐ 602  │
│  │ NUMBER OF CODE                    │╱     │
│  └───────────────────────────────────┘      │
│  FILE NAME:                                 │
│  ┌───────────────────────────────────┐ 604  │
│  │ FILE NAME                       I │╱     │
│  └───────────────────────────────────┘      │
│  PRIVACY ACCESS CODE:                       │
│  ┌───────────────────────────────────┐ 606  │
│  │       PRIVACY ACCESS CODE         │╱     │
│  └───────────────────────────────────┘      │
│                                             │
│  QI OPTIONS                                 │
│  QRCODE BORDER:                             │
│  ┌─────────────────────────┐                │
│  │ BLUE                  ▽ │                │
│  └─────────────────────────┘                │
│  QRCODE LOGO:                    608        │
│  ┌─────────────────────────┐   ╱            │
│  │ BLUE                  ▽ │                │
│  └─────────────────────────┘                │
│  EDITABILITY:                               │
│  ┌─────────────────────────┐                │
│  │ OPEN EDIT             ▽ │                │
│  └─────────────────────────┘                │
│  STORAGE DURATION (YEARS):         610      │
│  ┌───────────────────────────────────┐╱     │
│  │ 5                                 │      │
│  └───────────────────────────────────┘      │
└─────────────────────────────────────────────┘
```

FIG.6

TYPE OF DURATION:
PROQUIP ▾

NUMBER OF CODE:
5 —702

FILE NAME:
—704

PRIVACY ACCESS CODE:
PRIVACY ACCESS CODE —706

QI OPTIONS

QRCODE BORDER:
QI-BLUE ▾

☑ INCLUDE IMAGE FEATURE

QRCODE LOGO:
QI-BLUE ▾

EDITABILITY:
OPEN EDIT ▾
OPEN EDIT
CLOSED EDIT
} —708

STORAGE DURATION (YEARS):
5 —710

☐ INCLUDE IMAGE FEATURE
☐ ENABLED HOSPITAL NOTIFICATION
} —712

FIG. 7

5 NUMBER OF BROSCODE GENERATED AFTER GENERATED QR CODES, WE WILL SEND YOU AN E-MAIL

TYPE OF DURATION:

[ PROQUIP ▾ ]

NUMBER OF CODE:

[ 5 ]

FILENAME:

[ ]

PRIVACY ACCESS CODE:

[ PRIVACY ACCESS CODE ]

QI OPTIONS

QRCODE BORDER:

[ QI-BLUE ▾ ]

☑ INCLUDE IMAGE FEATURE

QRCODE LOGO:

[ QI-BLUE ▾ ]

EDITABILITY:

[ OPEN EDIT ▾ ]

STORAGE DURATION (YEARS):

[ 5 ]

☑ INCLUDE IMAGE FEATURE
☐ ENABLED HOSPITAL NOTIFICATION

[ SUBMIT ]   DOWNLOAD CSV   ⟩—802

FIG.8

< BACK

OPERATOR MANUAL

DELETE 🗑

| DOCUMENT ⌄ | | CHOOSE FILE | NO FILE CHOSEN | | UPDATE |

OPERATION.PDF

| TEXT ⌄ |
| DOCUMENT ▸ |

FILE  EDIT  VIEW  INSERT  FORMAT  TOOLS  TABLE     ADD

↶ ↷  | 🖼 <>

I

| TEXT ⌄ |

FILE  EDIT  VIEW  INSERT  FORMAT  TOOLS  TABLE     ADD

EDIT/DELETE ITEMS

OPERATOR MANUAL

SAFETY VIDEO

} 1302

ENGLISH ▽

[+ ADD ITEM] [MAKE CODE PRIVATE?] [✣ REORDER?]

ITEM DESCRIPTION:
PRODUCT PHOTO

HAS SUBQUIPS?: ☐

HOW DO YOU WANT TO COMMUNICATE?:
PHOTO ▽

[CHOOSE FILE] NO FILE CHOSEN

LANGUAGE:
ENGLISH ▽

TAB COLOR:

TEXT COLOR:

[SUBMIT]

FIG.13

```
EDIT/DELETE ITEMS

OPERATOR MANUAL

SAFETY VIDEO

PRODUCT PHOTO

ENGLISH                              ▽

[+ ADD ITEM]  [MAKE CODE PRIVATE?]  [✧ REORDER?]
```

FIG.14

```
EDIT/DELETE ITEMS

OPERATOR MANUAL                      ▽

SAFETY VIDEO

PRODUCT PHOTO

ENGLISH                              ▽

[+ ADD ITEM]  [MAKE CODE PRIVATE?]  [✧ REORDER?]
```

FIG.15

QUICK INFORMATION PORTAL

CROSS-REFERENCE

The present disclosure claims benefit and priority to U.S. Provisional Patent Application 63/272,602, filed on Oct. 27, 2021, and titled Quick Information Portal (QUIP). The contents of which is hereby incorporated by reference in the entirety.

FIELD

The present disclosure relates to computer implemented systems and methods for providing information access. In particular, computing systems and methods for gathering, formatting, curating, and distributing product and other information for access through a visual code and a mobile computing device.

BACKGROUND

Access to information such as product manuals, user guides, tutorials, video guides, and others are often found on the manufacturers website, if at all, and will typically require a deep understanding of the product to locate. For example, medical devices may have numerous models and editions, some even designated for country of origin and use, along with other derivative models such as for power requirements or otherwise. In doing so there is a dizzying array of choices and it becomes arduous and time consuming to locate material.

Further, information in general, when it relates to a specific category or topic, is difficult to maintain and often causes painstaking rewriting of html and css in order to present it digitally.

There remains a need to place a visual code on products or as part of a handout (sticker, mailer, information card) that curates the information as well as allows for rapid deployment and frequent low cost updates. The disclosure herein addresses this long sought need with a practical and efficient solution.

SUMMARY

Various aspects of computer and hardware implemented systems and methods are disclosed herein. In one aspect, a method is disclosed for providing rapid access to product information on a mobile computing device, such as a mobile phone or tablet. First, the method provisions an online platform located at a domain name and a database repository supporting the online platform. Next, the method includes generating, by the online platform at least one visual code that is scannable by the mobile computing device, wherein generating creates a subdomain and provisions a database location within the data repository for each visual code. Next, gathering product information and associating it with the at least one visual code directing to the subdomain. Then, formatting the product information based on at least the type of content, wherein the formatting of the product information identifies it as a photo file, a video file, a pdf file, a sound file, or a text file and places a text label associated with a given file and further associates the given file with the at least one visual code. Next, storing the product information on the database repository of the online platform. Lastly, accessing, by the mobile computing device, the stored product information by scanning the at least one visual code.

In other aspects, a computer implemented method for providing instant access to information on a mobile computing device configured with a camera module is disclosed. The method first provisions an online platform located at a domain name and a database repository supporting the online platform. Next, generating by the online platform at least one visual code that is scannable by the mobile computing device, wherein generating creates a subdomain and provisions a database location within the data repository for each visual code. Then issuing, by the online platform, an image file containing the at least one visual code. Next, gathering information and associating it with the at least one visual code directing to the subdomain. Then, formatting the information based on at least the type of content, wherein the formatting of the information identifies it as a photo file, a video file, a pdf file, a sound file, or a text file and places a text label associated with a given file and further associates the given file with the at least one visual code. Then, storing the information on the database repository of the online platform. Then, scanning the at least one visual code by the mobile computing device configured with the camera module. Then, accessing the stored information by the mobile computing device. Lastly, editing the stored information from the mobile computing device accessing the stored information within the database repository on the online platform.

These and other embodiments are described in greater detail in the description which follows.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. In the drawings:

FIG. 3 is an illustration of an example user interface viewing a hyperlink associated with a visual code;

FIGS. 6-11 illustrates examples of a user interface of a visual code generator;

FIGS. 12-15 illustrates examples of a user interface for editing the information created and associated with a visual code;

DETAILED DESCRIPTION

Figure 1:
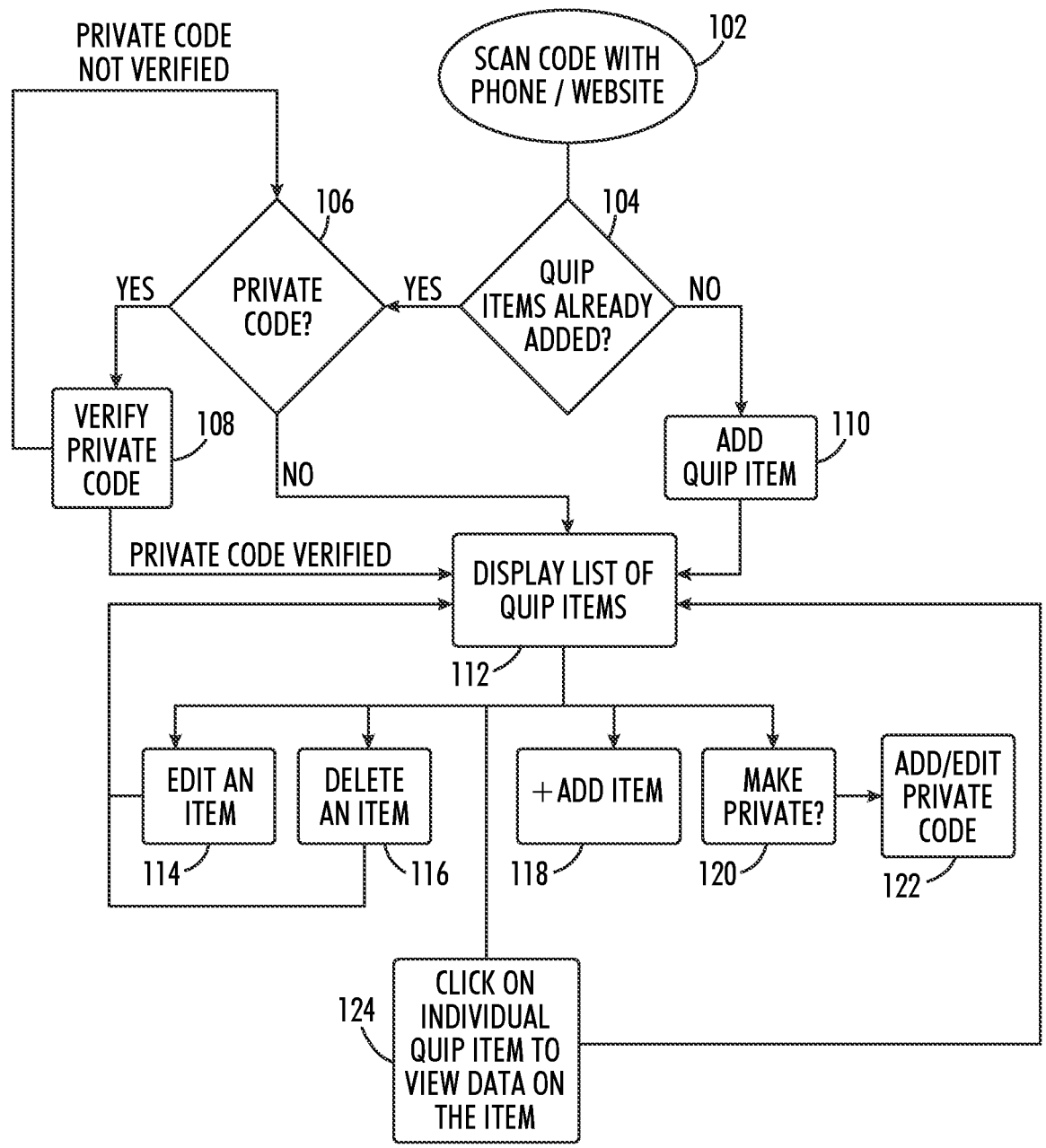
FIG. 1 is a flow chart illustrating an example method in the generating and or provisioning of and editing thereof of information related to a visual code.

Implementations and embodiments described herein can be understood more readily by reference to the following detailed description, drawings, and examples. Elements, apparatus, and methods described herein, however, are not limited to the specific implementations presented in the detailed description, drawings, and examples. It should be recognized that these implementations are merely illustrative of the principles of the present disclosure. Numerous modifications and adaptations will be readily apparent to those of skill in the art without departing from the spirit and scope of the disclosure.

I. BACKGROUND TECHNOLOGY

Organizing information in useful ways is a continual process. Many inventors have progressed the science of storing information. Early on the library catalog system served as a useful means for organizing locations of texts. The internet and connected computers through the world wide web introduced an abundancy of data. Along with that abundant data came problems with how to organize the information. Thus, searching algorithms were devised, and crawlers, along with meta tags and the like to assist in compiling data based off a query.

When QR codes were introduced they allowed a mobile computing device or camera to scan the code to retrieve data. That data is limited to a particular address and is often not editable. The disclosure herein advances techniques of QR codes to allow for accumulating information, such as product information, health information and more and building a hierarchy that allows for accessibility and direct editing by the owner of the visual code.

II. EXAMPLE EMBODIMENTS

In one aspect, a computer implemented method for providing rapid access to product information on a mobile computing device is disclosed. A computer may be a server, or a standard general purpose computer as identified in FIG. 16. Further, the rapid access is provided through a visual code accessing an online platform. In the example method an online platform is provisioned and hosted on a server at a URL and associated with a domain name. In this example the visual code is not associated with any product or knowledge base on creation, thus generating a code prior to affixing it to a product, etc. In this aspect, manufacturers may provision codes and begin working consecutively on content even without the manufacturer. For example, social media insiders may be provisioned codes in which they can provide useful content, the manufacturer then may choose whether to activate the code on the product. Continuing, the provisioned online platform is configured with a database such as SQL database or other relational database that allows configuration and storage of information. In the example method the online platform services may be provisioned through a cloud server or hosting environment with built in libraries such as Amazon Web Services (AWS)™ or Microsoft Azure™ or Google Cloud™.

In other aspects the online platform may be a web platform through a content management system such as WordPress™ that allows pairing with a database repository such as MySQL™ or MariaDB™ or other relational databases. In either embodiment the core functionality remains the same, the online platform provides a form based generator that allows various inputs to generate a visual code. Further, there may be a host of open source plugins or content and libraries paired therewith. In the example, the generated visual code is scannable, and may resemble a QR code that includes border options and the placement of logos or other details in which to customize the scannable visual code. In one aspect, a mobile computing device with a camera is capable of scanning the visual code and then opening a web browser on the mobile computing device that points to a specific domain, wherein the domain is supported by a database repository.

The database repository may be a relational database repository and may be used to store the various information types, such as a photo file, a video file, a pdf file, a sound file, or a text file. Further, from an editing menu on the online platform a user may edit the information that is found at the data repository and such information is reflect to the same visual code. Additionally, a subdomain may be propagated or created and configured to the visual code, thus allowing generation of subdomains from a domain based on at least one visual code. Therefore, in such an arrangement, new information may be compiled and placed at disparate subdomains that all originate from one visual code and domain and that are all accessible from the one visual code.

In other aspects of the method, from the edit menu or creation menu, a formatting options allows editing or creating of the content for the various file types. In this example the edits are stored and pushed to the database repository allowing for rapid updates to information behind the visual codes, that is information stored in the data repository and assigned to a web domain. Further, the information is accessible by any means that allow for scanning of visual codes and opening and translating through a web browser. Thus mobile computing devices or computing devices with a camera are capable of accessing the information rapidly and without user input.

In additional embodiments the methods disclosed herein further comprise displaying the product information in a formatted version that is adapted to the mobile computing device to allow for accessibility and viewing. In this example the video files or other file types may be formatted to fit a particular screen. For example, a tablet computer possesses a larger dimension screen, and scaling of the content is provided through the online platform. In other embodiments scaling may be rendered on the device.

In another aspect, the steps may include creating additional subdomains for each domain linked to a data repository, in this aspect the additional subdomains may originate from the original visual code. Further, the content hosted on the data repository may be accumulated from data scraping (also known as data extraction or web scraping) of target domains, thus automating the intake or gathering of information. An example of a python library that may scrape the data is Beautiful Soup, which allows for rapid data acquisition and implements an ability to incorporate the data onto the data repository. There are many libraries that may assist with the acquisition of structured web data that may allow for automated gathering of information within a data repository linked to at least one visual code. Further, the data portion may be performed by third parties that are given access, thus allowing independent third parties to generate content that is associated to a visual code.

In one aspect, with respect to the visual code, at the generating step the visual code may also be provisioned with a duration code, a privacy access code, a border for styling such as a blue border or a border to match an organizations preferred colors, a logo, and a setting for allowing edits, wherein edits may be placed on already issued visual codes by altering the data repository that is ultimately directed to a domain name. The ability to edit allows for not only editing post the generation of the visual code, but also to rapidly deploy codes and frequently update the information behind the code. In one aspect a visual code may serve as a digital journal, wherein updates are accessed by scanning the code and editing daily text. Similarly, the access code or privacy code allows only users with the code to access the information or to edit the information. When selecting the privacy access code a user may provide secured access for health information or personal identifiable information. In this aspect the visual code is protected and only accessible from users with a passcode. In other aspects the access code may be used for granting access to editing the content, but not restrict access. In the two differing embodiments the privacy access code may be used for editing or may be used for accessing in general, thereby allowing only approved users to edit content or approved users to view content.

III. WITH REFERENCE TO THE FIGURES

Referring now to FIG. 1, a flow chart illustrating an example method in the generating and or provisioning of and editing thereof of information related to a visual code. In the example, a code is scanned 102, wherein the first check is whether the code was provisioned with data in a data repository, checking whether items were already added 104. Next, in the example, the selection of a private code 106 may be entered and verified 108 to verify access to the materials. This may be useful with regard to medical information or other personal information that a code would be utilized to prevent unauthorized access. The code 106 may also serve to restrict access to users or supplemented with two factor authentication. In the example, if the private code is not verified access will be restricted, otherwise it will display a list of information 112, such as product information or medical information, or general stored information. Often times, such information is compiled based on like references. For example, a chainsaw product may have a product manual, a user safety video, and a warranty card all within one visual code and stored on a data repository and linked to the visual code.

In some aspects, the information may be editable 114, and may also have the option to delete 116. This may be made available through the private access code for the editing of the data stored on the data repository. In other aspects an item may be added, 118, or made private via a private access code 120, and or edit or change the private access code 122. The user then may navigate or click an individual item associated with the information retrieved from the visual code 124.

Figure 2:
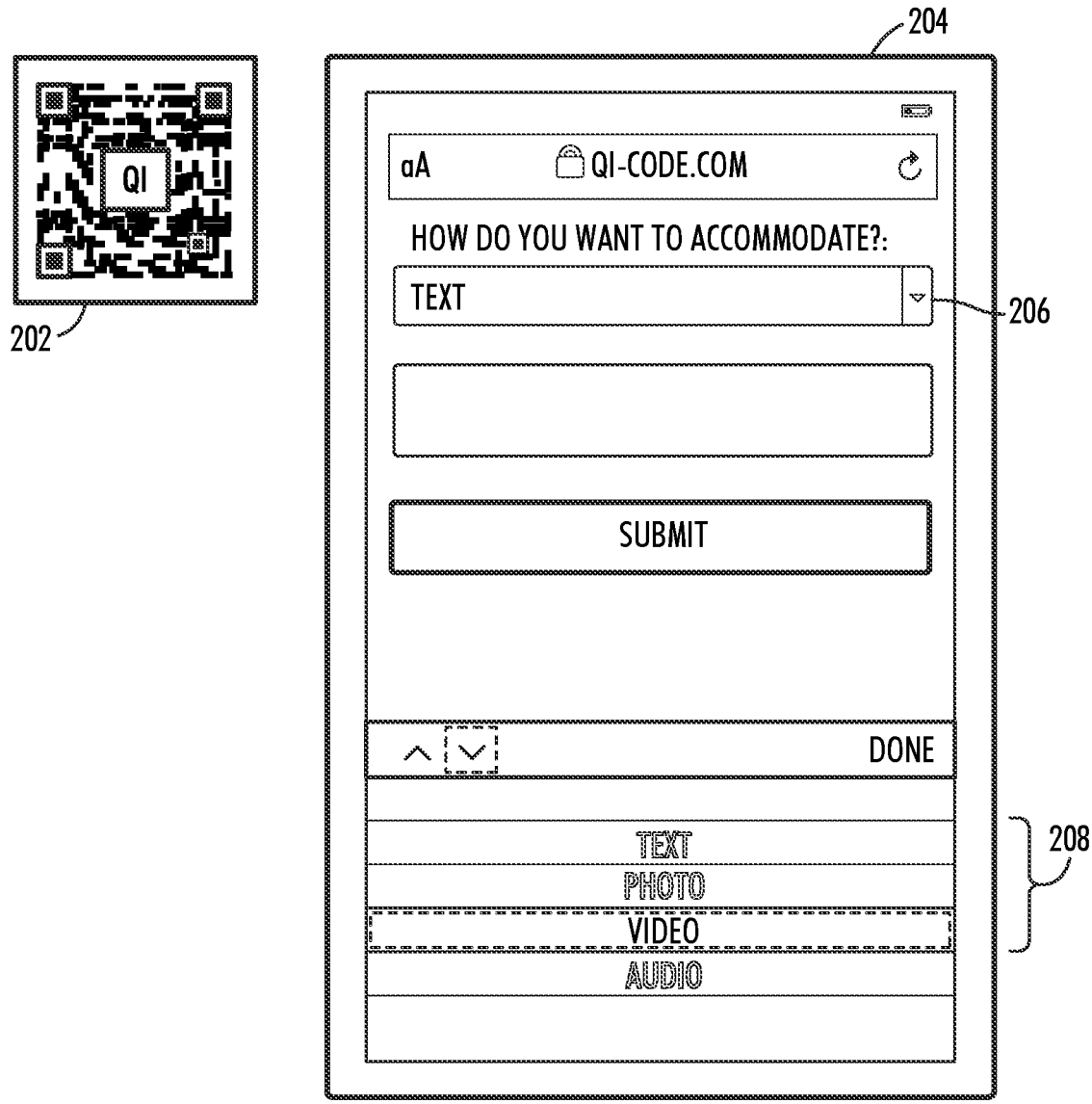
FIG. 2 is an illustration of an example user interface wherein generating a visual code is processed.

Referring now to FIG. 2, an illustration of an example user interface wherein generating a visual code is processed. In the example, a visual code 202 is displayed with a border and a center graphic. The central graphic or logo is one option upon generation of the visual code that may be specified within the online platform. The option may receive a jpg (jpeg) format or a png format and adapt the logo or graphic for printing central to the visual code. Further, a border option may be placed that allows the generation of a unique border or pattern in which will wrap the exterior of the visual code and provide additional personalization.

Continuing, an example user interface is 204 is disclosed that displays when accessing the visual code 202. In the example, the visual code points to a location on a database and is displayed as a subdomain or domain. The online platform, such as a WordPress™ platform with plugins and scripts to allow for generation of a visual code from a visual code generator takes user input or input that may be automatically gathered from an rule based or inference engine to generate one or more visual codes that each address to a specific database location as well as a domain name.

Further, in the example of FIG. 2, the file type 208 of item to be stored on the data repository may be specified, allowing for customization of multiple types of files and information, such as a product brochure for a piece of health equipment, along with a video for safe usage, and a warranty card in the event the item needs repairs or warranty information. Additional product information may be sound instructions for the visually impaired, or photos showing use or explaining concepts. The user interface in FIG. 2, for entering information into a data repository, is but one example of how disparate information may be organized and linked to a visual code and a domain name.

Referring now to FIG. 3, an illustration of an example user interface viewing a hyperlink associated with a visual code. In the example, a user may be viewing this interface of curated information showing a quick information portal 300 for a vacation rental which includes information such as a welcome message, house rules, wifi and appliance details, things to do and see in the area, along with emergency contact information. The host may place a visual code that is scannable that will display the curated information on a web browser, thus allowing quick information to be displayed in a curated and visible format. Further, additional domains may be created, such as subdomains for properties. In one example a campus with one property may be assigned one visual code, and the various rooms or housing elements within the campus may have subdomains from the main domain all linked to the same visual code. Thereby allowing rapid deployment of basic or core information, and filtering information more curated to a specific room based on the needs of the room, such as what appliances are available or specific directions from the room.

Figure 4:
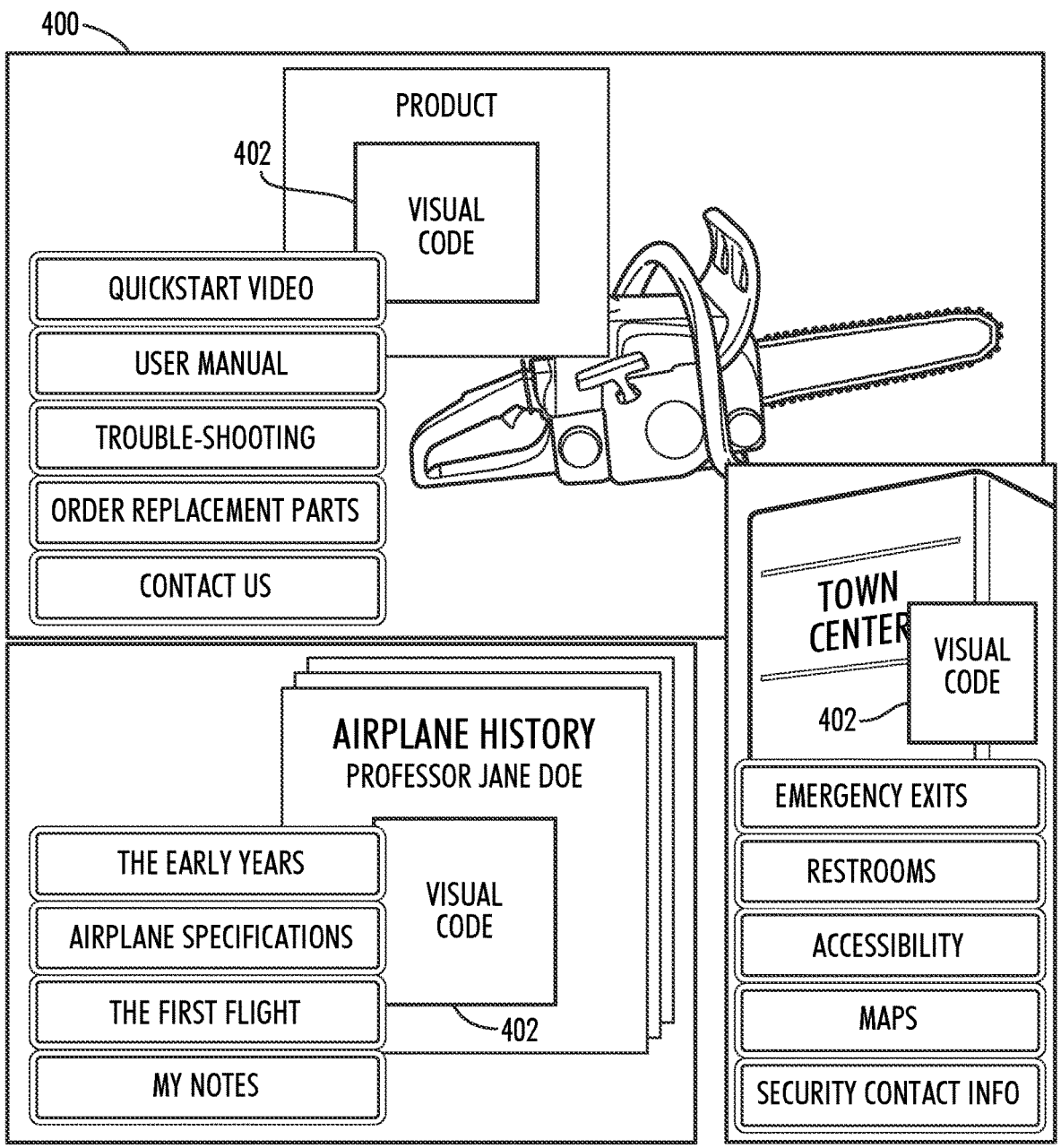
FIG. 4 is an illustration of an example user interface viewing a hyperlink with information stored in a data repository associated with a visual code.

In the example of FIG. 4, an illustration of an example user interface viewing a hyperlink with information stored in a data repository 400 associated with a visual code. In this aspect, a user is displayed with multiple visual codes 402 linked to various objects and locations, including a user's own history. For example, a user may be interested in a product, by scanning the product with a computing device the product information, such as a quick start video, a user manual, troubleshooting guide, replacement parts, and contact information for the manufacturer may be organized and displayed in a single screen. Thus, overcoming the issue of identifying the product online, searching through pages of information, each of which may be on a different domain. Wherein the present disclosure rapidly adds material from a multitude of domains to a single listing location. As discussed previously, an editing menu allows the creator or a user with an access code to edit the base material, if the contact us page needs updated it can be provisioned through the generator forms editor option and allow for rapid updating without a need to change the manufacturers website. In this regard manufacturers may see benefits from issuing multiple models of products by allowing updates to product information rapidly and within an easily deployable ecosystem.

Continuing, within the same display or screen a user may view, for example, their flight history by scanning a visual code they printed and hold in their wallet or on their luggage. This allows access to information a user may curate and attach to a visual code, wherein one domain may be for vacations, and subdomains, attached to the same visual code, may show the various locations. Similarly, for flight training schools or for guides for pilots to review the airplane information by scanning a visual code and having a categorized set of information. An additional example is provided for a visual code to provide access to information regarding an outdoor mall or other commercial center, by providing information such as emergency exists, restrooms maps, and security information.

Figure 5:
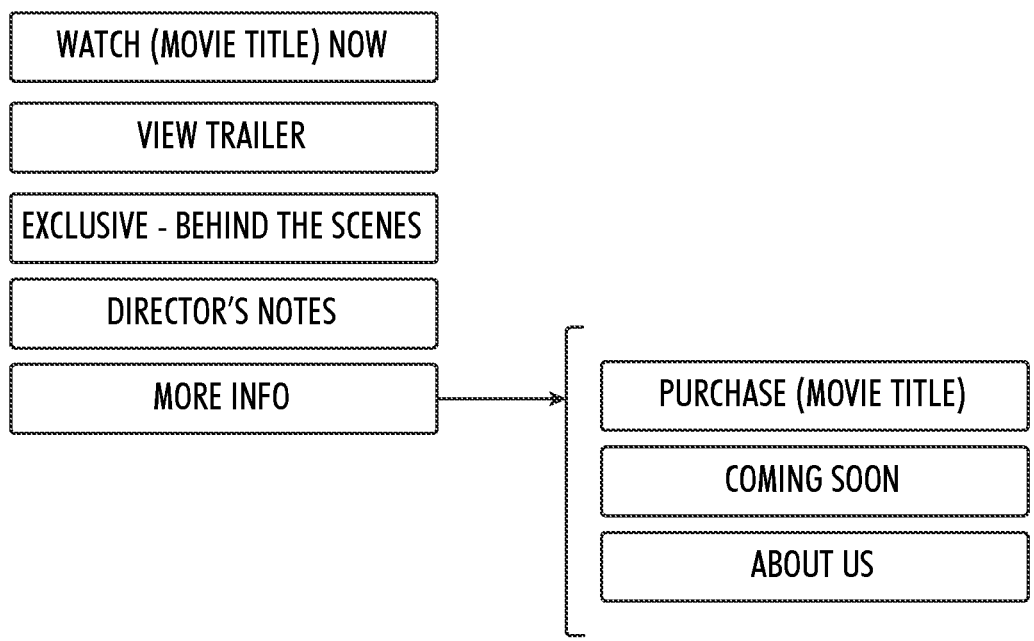
FIG. 5 illustrates an example user interface viewing subdomain information stored on a data repository associated with a visual code.

Referring now to FIG. 5, an illustration of an example user interface viewing subdomain information stored on a data repository associated with a visual code. The disclosed illustration shows a hierarchy without the information of the domain and subdomain configuration wherein a single visual code may propagate multiple end URL's, but remain accessible through one scanning image.

Referring now to FIGS. 6-11, wherein illustrations of examples of a user interface of a visual code generator are provided. In the example of FIG. 6, an interface for a visual code generator 600 is disclosed. The code generator accepts user input as well as system provided information to generate a visual code, wherein generating the visual code creates a URL or domain name for the visual code, and provisions a database repository for storage of content. In the example, a type of duration is set with account access to a sample vendor of the quick information portal, wherein different tiered settings may be available. In one aspect the number of codes 602 is the number of visual codes to generate. Additionally, the file name 604 specifies the filename of the visual code and may also be used to provision a database repository file name. The privacy access code 606 grants access to the domain or subdomains. In doing so security is provided for personal identifiable information, such as information like personal health information. In another aspect the open edit allows a customer or end user, as well as an owner or administrator to edit, thereby allowing things like a running maintenance log. Wherein closed edit, or edit turned off allows only the administrator and not the end user the ability to edit information within the database repository or within the generated code.

Continuing, in the example of FIG. 6, the QI options 608 are options for stylizing the visual code. In one aspect a QR Border allows customization with colors for a border. In other aspects it may be lines or other artwork for a border. In another aspect the logo allows for customization of a logo or of graphics or text to be placed within the visual code. Lastly, the editing feature allows a user or anyone with the privacy access code to edit the contents or product information, or information within the data repository. The storage duration 610 allows the visual code to store information for a set period of time, in the example 5 years is specified. However, any duration, including into perpetuity may be set to allow the domain point to a database to remain open for viewing with the scannable visual code.

Referring now to FIG. 7, we see an additional example of a user interface for a visual code generator. Some of the features remain the same from FIG. 6, such as the number of codes to generate 702, the file name for the codes 704, and the privacy access code 706. This example further discloses an option to include an image file on top of the visual code. This option allows a logo or image to be placed central to the visual code. for bringing is disclosed through a check box. Additionally, visual code options 708 allow for setting user editing rights. The storage duration 710 allows a specified duration in which the data repository will hold the information. Lastly, additional options may be customized such as include image feature and enabled hospital notification. In the include image feature an image may be included with the generated code. In the enabled hospital notification, a notification based on hospital codes or other certifications may be generated by the code generator.

Referring now to FIG. 8, an illustration of the generation complete with an alerting function to alert the processing of visual codes. In the example multiple visual codes may be provisioned so as to develop multiple domains and data repository locations so that a plurality of codes may create a plurality of resources, all in which may have underlying database tables. This feature, generating multiple visual codes, is useful with large datasets such as generating visual codes for customer's information or health information, wherein each department of a hospital or each drug, for example, may be associated with a visual code and information provided based on the medical department or drug. In the example, a downloadable comma separated value file allows for additional interaction and processing, such as executing a summary of all created visual codes and information associated therewith using functions that are similar as to excel. Further, the comma separated value file may be incorporated into an analytics module that runs under the platform to share insight, such as scans or access of the visual code. In this regard interoperability is created and may allow for disclosures herein to coordinate with electronic health records or manufacturing records.

Figure 9:
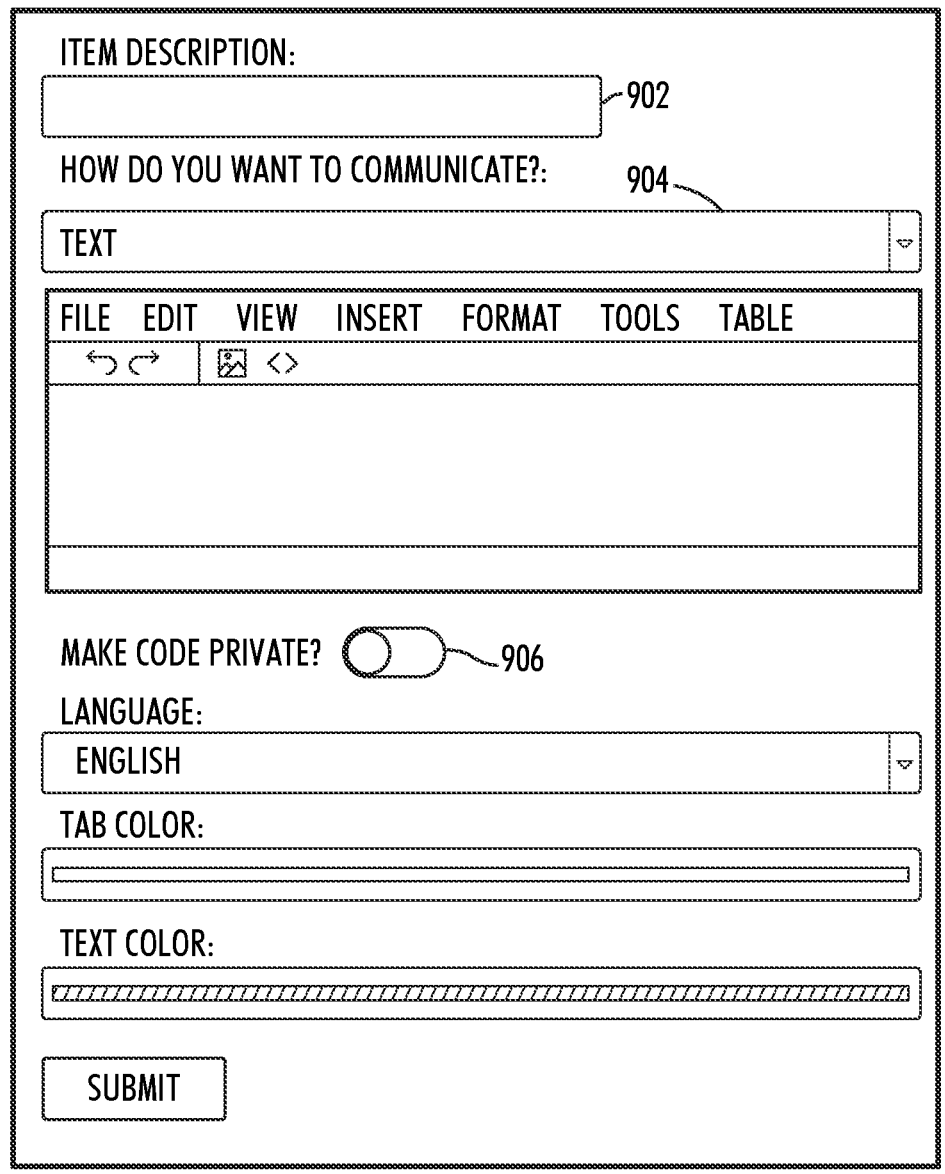

Referring now to FIG. 9, yet another example of entering information into the data repository. Wherein the item description 902 is entered which will be used to identify the item. For example, the item description 902 may be User Manual, and the communication 904 may be text, wherein a block of text will then be populated under the visual code and available by scanning the visual code or accessing the generated domain. Additionally, objects can also be made private beneath the privacy access code, as a second layer of protection by using the make code private feature 906.

Figure 10:
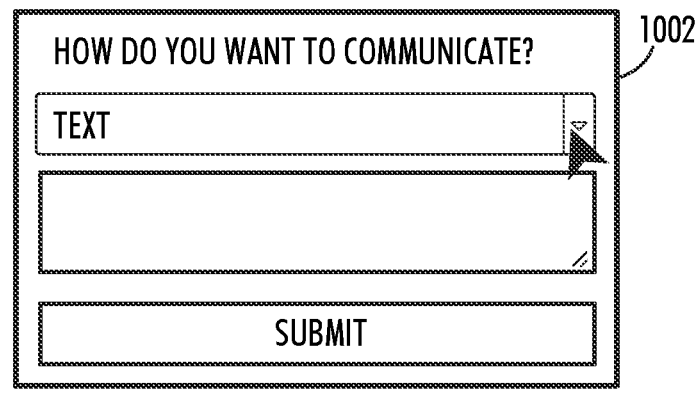
Figure 11:
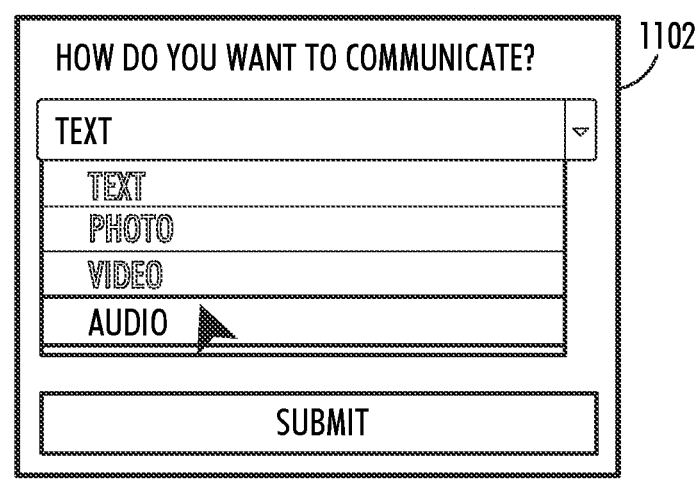

FIGS. 10-11, are additional embodiments or examples of entering information into a data repository that will be available by scanning the visual code and accessing a domain name associated with the visual code. In the example of 1002 a text option is selected for uploading a text file. In the example of 1102 we see an audio option selected for uploading audio onto the data repository.

Referring now to FIGS. 12-15, illustrating examples of a user interface for editing the information created and associated with a visual code. In the example of FIG. 12 a user interface is displayed that shows on the left hand side the already created and curated content that may be edited. In the example, a document is selected and allows the uploading of a pdf document to be rendered on a mobile computing device for quick access by a user. The document further allows a user to create a document right in the menu, without having to upload content from a .doc or .docx or pdf. This allows for configuration similar to html for posting documents with text and images directly to the repository for viewing by scanning the visual code.

Turning to FIG. 13, an example user interface that may be displayed on WordPress or other content management system, shows the ability to edit or delete items, including also the ability to reorder items or place items within specific subdomains that allows a tiered data approach and the ability to filter down. Returning to the chainsaw example from earlier, the main domain may originate from one visual code that allows subdomains for each model, wherein each model may have their own visual code or may be associated or linked to the main visual code. For example, the has subquips option indicates whether or not to create subdomains which originate from the same visual code, but allow accessing under the main domain.

FIGS. 14-15, are additional illustrations showing the editing and removing of an item, as well as selecting a preferential language. Wherein selecting the language will automatically translate the text documents to the language utilizing an API to Google Translate™. Additional elements include making the access from the visual code private, which may be done at creation or post creation, as well as ordering elements. Further, passcodes may be placed on additional files within the data repository for a second or third layer of security. The examples of user interfaces herein are not exhaustive, it is contemplated that the fields may remain the same, however, the interface or design may differ without significantly deviating from the disclosure herein.

Figure 16:
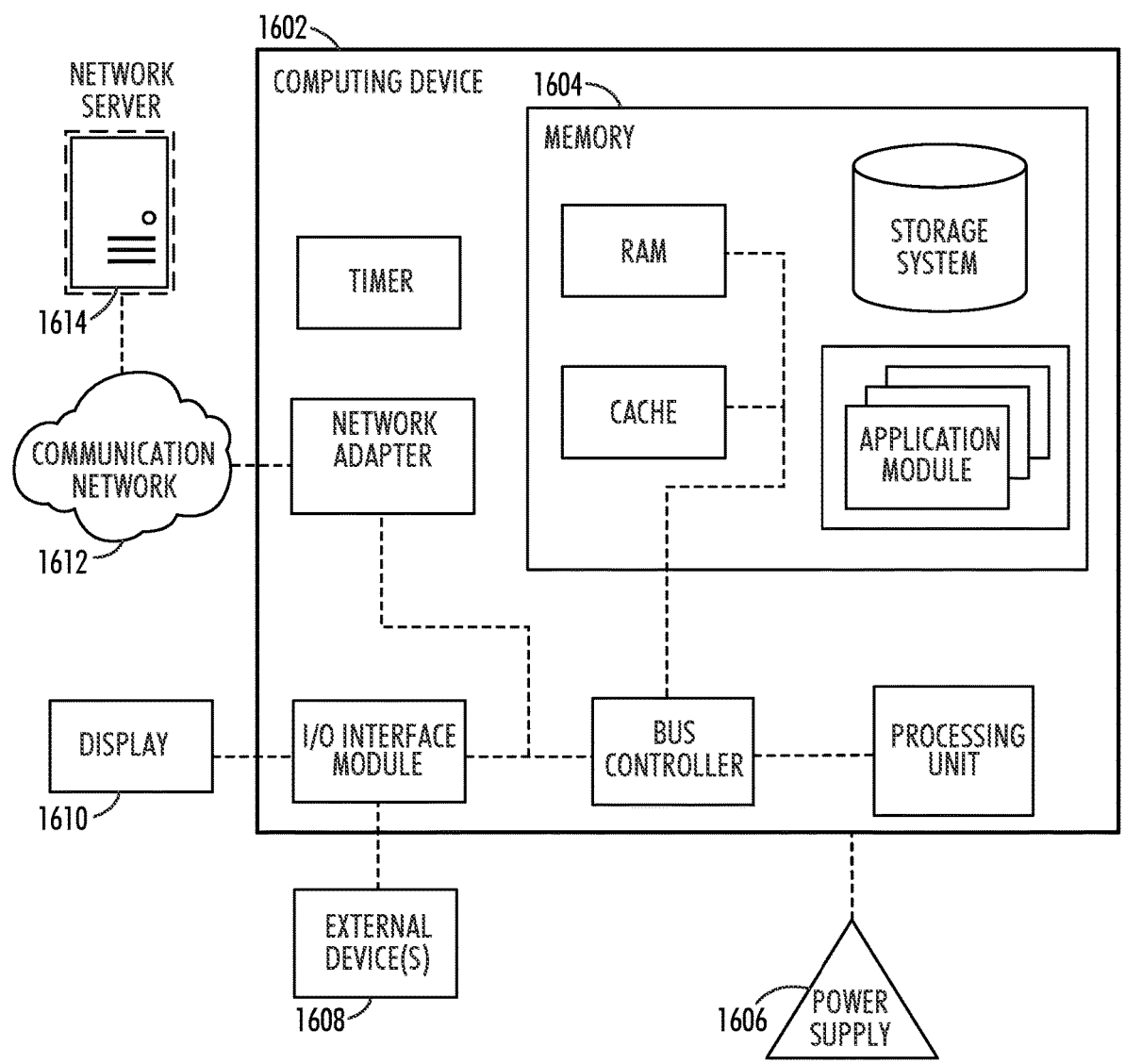
FIG. 16 is a block diagram of an example computing device, such as a mobile computing device.

Turning now to FIG. 16, a block diagram of an example computing device, such as a mobile computing device. In various embodiments, the computing device may comprise a personal computing device (e.g., smart phone, a computing tablet, a personal computer, laptop, PDA, Bluetooth device, etc.) capable of communicating with the network and scanning a visual code. In the examples herein the computing device is equipped with memory, wherein the memory contains a long-term storage system that is comprised of solid-state drive technology or may also be equipped with other hard drive technologies (including the various types of Parallel Advanced Technology Attachment, Serial ATA, Small Computer System Interface, and SSD). Further, the long-term storage may include both volatile and non-volatile memory components. For example, the processing unit and or engine of the application may access data tables (three dimensional scans) or information in relational databases or in unstructured databases within the long-term storage, such as a SSD. Some other common forms of computer readable media which may also be included herein are, for example, a floppy disk, a flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

The memory of the example embodiment of a computing device may also contain random access memory (RAM) which holds the program instructions along with a cache for buffering the flow of instructions to the processing unit. The RAM is often comprised of volatile memory but may also comprises nonvolatile memory. RAM is data space that is used temporarily for storing constant and variable values that are used by the computing device during normal program execution by the processing unit. Similar to data RAM, special function registers may also exist, special function registers operate similar to RAM registers allowing for both read and write. Where special function registers differ is that they may be dedicated to control on-chip hardware, outside of the processing unit. Together, the computing module works to execute program instructions, transfer data, generate insights through algorithmic means, and provide intelligence and a way to execute instructions to perform functions herein.

Further, the computing device includes a bus or other communication mechanism for communicating information data, signals, and information between various components of computer device. Continuing, the computing device maintains I/O components through the I/O interface module, such as external devices 1608, which may be added to improve, enable, or automate functions herein. Wherein a visual code reader may be installed at a site, such as a hospital or a hardware store that allows scanning on products and displaying on a screen at a site location. In this aspect the information is displayed readily at a point of sale or other location that allows accessibility to the user for product or other information. A display may include a touch screen that displays information to user and receives user input from user or a display may be a touch insensitive display. A display may be a mobile device display, a projection display that projects images onto a transparent, partially transparent or opaque structure, or may include any other suitable display technology. The computing device may monitor user input on the touch screen, on any other touch-sensitive device (e.g., a touchpad on a laptop), or using other input components (e.g., a mouse) and may recognize user input for association with transactions, and/or to activate certain functions when scanning and displaying information from the visual code.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

Therefore, the following is claimed:

1. A computer implemented method for providing rapid access to product information to a user on a mobile computing device, comprising:
    provisioning an online platform located at a domain and a database repository in communication with the online platform supporting the domain;
    generating, by the online platform, and based at least in part on one or more user inputs, at least one visual code that is scannable by the mobile computing device and a logo with a border associated with the at least one visual code and that is viewable by the user, wherein the generating also creates at least one subdomain for the visual code, the at least one subdomain linked to both the domain and the database repository and also provisions a database location within the data repository for the at least one visual code and the corresponding at least one subdomain;
    generating, by the online platform, a privacy access code field for the user to select a privacy access code;
    gathering product information from structured web data and associating it with the at least one visual code directing to the subdomain, wherein gathering the product information includes utilizing a web scraper to scrape a domain for the product information;
    formatting the product information based on at least the type of content, wherein the formatting of the product information identifies it as a photo file, a video file, a pdf file, a sound file, or a text file and places a text label associated with the photo file, the video file, the pdf file, the sound file, or the text file and further associates the photo file, the video file, the pdf file, the sound file, or the text file with the at least one visual code;
    storing the formatted product information in the database repository at the database location and assigning the formatted product information to the at least one subdomain; and
    accessing, by the mobile computing device, the stored formatted product information by scanning the at least one visual code.

2. The method of claim 1, wherein the generating also creates a plurality of subdomains for the visual code, each subdomain linked to the domain, and wherein a database location is created within the data repository for each subdomain.

3. The method of claim 1, further comprising editing the formatted product information from an editor on the online platform, wherein the edited formatted product information is automatically reflected to the visual code.

4. The method of claim 3, wherein an access code enables the editing of the formatted product information.

5. The method of claim 1, further comprising adding new content to the data repository at a database location corresponding to a particular subdomain, wherein the new content is automatically reflected to the visual code.

6. The method of claim 1, further comprising editing the visual code by changing metadata corresponding to the visual code in the data repository.

7. The method of claim 1, wherein the at least one subdomain comprises a hierarchy of multiple subdomains.

8. A computer implemented method for providing instant access to information to a user on a mobile computing device configured with a camera module, comprising:
   provisioning an online platform located at a domain and a database repository supporting the online platform;
   generating, by the online platform, at least one visual code that is scannable by the mobile computing device and a logo with a border associated with the at least one visual code and that is viewable by the user, wherein generating also creates a plurality of subdomains for the visual code, the plurality of subdomains are linked to both the domain and the database repository and also provisions a database location within the data repository for the at least one visual code and the corresponding plurality of subdomains;
   issuing, by the online platform an image file containing the at least one visual code;
   generating, by the online platform, a privacy access code field for the user to select a privacy access code;
   gathering information from structured web data and associating it with the at least one visual code directing to the subdomain, wherein gathering the product information includes utilizing a web scraper to scrape a domain for the product information;
   formatting the information based on at least the type of content, wherein the formatting of the information identifies it as a photo file, a video file, a pdf file, a sound file, or a text file and places a text label associated with the photo file, the video file, the pdf file, the sound file, or the text file and further associates the photo file, the video file, the pdf file, the sound file, or the text file with the at least one visual code;
   storing the formatted information on the database repository at the database location and assigning the formatted product information to at least one of the plurality of subdomains;
   scanning the at least one visual code by the mobile computing device configured with the camera module;
   accessing, the stored information by the mobile computing device; and
   editing the stored information from the mobile computing device accessing the stored information within the database repository on the online platform.

* * * * *